Sept. 21, 1948.  J. W. BROWN, JR  2,449,840
APPARATUS FOR MANUFACTURING FINNED TUBES
Original Filed April 2, 1941  2 Sheets-Sheet 1
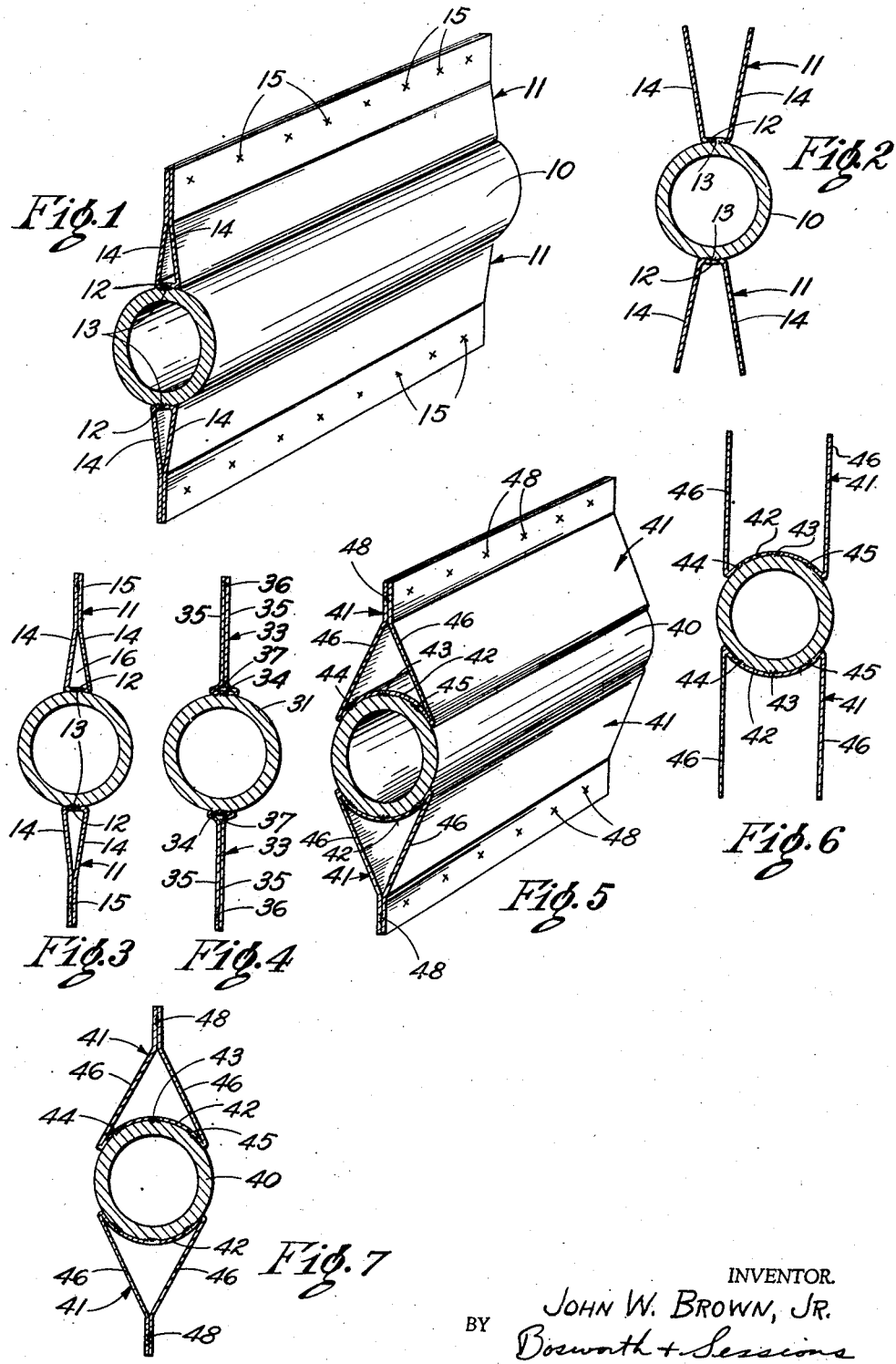
INVENTOR.
JOHN W. BROWN, JR.
BY Bosworth + Sessions
ATTORNEYS Sept. 21, 1948. J. W. BROWN, JR 2,449,840
APPARATUS FOR MANUFACTURING FINNED TUBES
Original Filed April 2, 1941 2 Sheets-Sheet 2
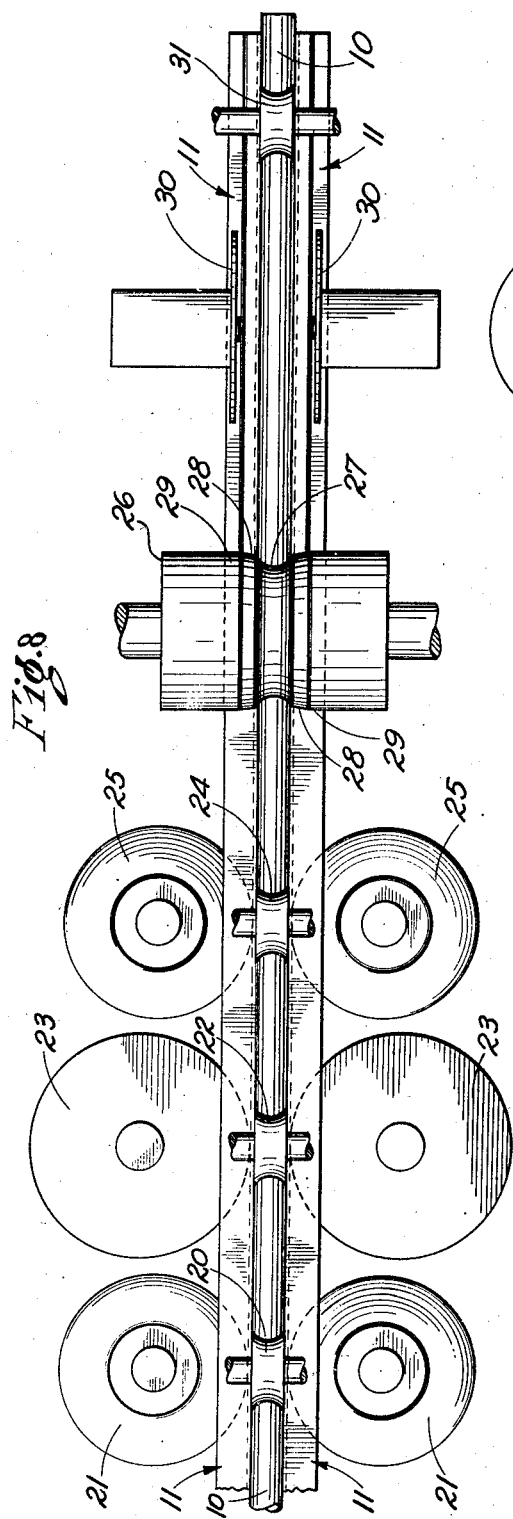
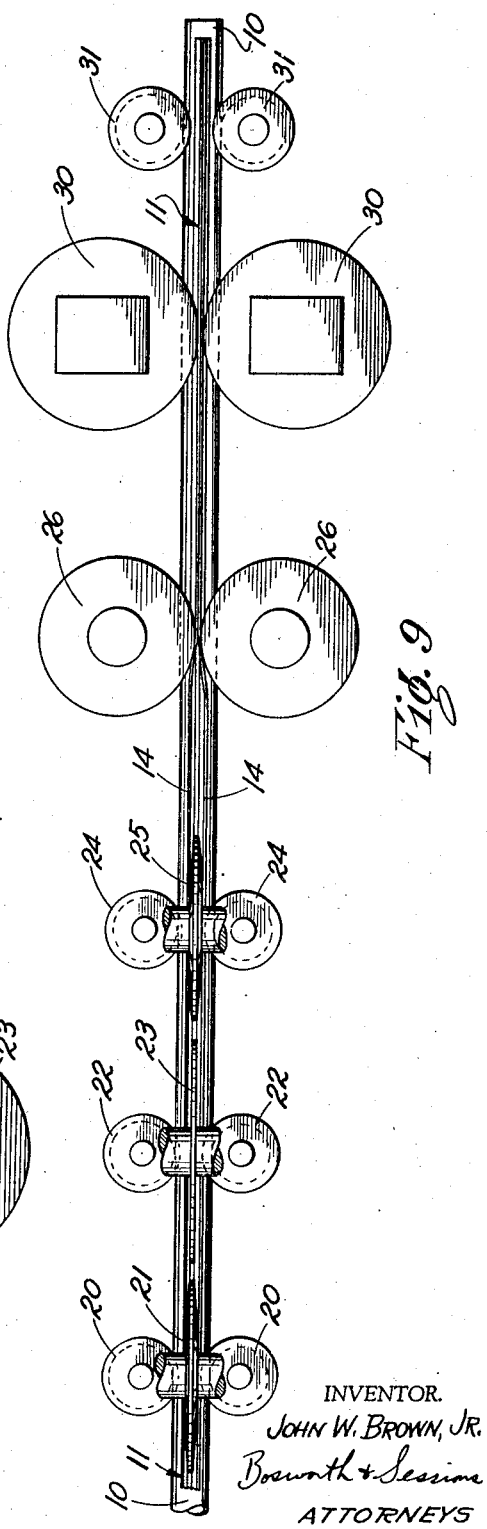
INVENTOR.
JOHN W. BROWN, JR.
Bosworth + Sessions
ATTORNEYS Patented Sept. 21, 1948

2,449,840

UNITED STATES PATENT OFFICE 2,449,840

APPARATUS FOR MANUFACTURING FINNED TUBES

John W. Brown, Jr., Lakewood, Ohio, assignor to Brown Fintube Company, Elyria, Ohio, a corporation of Ohio Original application April 2, 1941, Serial No. 386,503. Divided and this application July 13, 1944, Serial No. 544,713

2 Claims. (Cl. 219—4)

This invention relates to apparatus for making heat exchanger tubes provided with exterior fins for increasing the external surface area thereof. This application is a division of my copending application Serial No. 386,503, filed April 2, 1941, now Patent No. 2,355,621, dated August 15, 1944.

In my prior applications Serial No. 323,593 filed March 12, 1940, and Serial No. 380,690 filed February 26, 1941, now respectively Patent No. 2,298,249, issued October 6, 1942, and Patent No. 2,261,137, issued November 4, 1941, I have disclosed heat exchanger tubes having fins secured to the exterior thereof and methods and apparatus for making such tubes. The tubes specifically disclosed in said applications were particularly adapted to installations wherein the flow of fluid on the exterior of the tube was longitudinal. The present application relates more specifically to the manufacture of heat exchanger tubes adapted for transverse flow of fluids on the exterior thereof, or to form wall structures, partitions, and the like.

In my said prior patents, I disclosed tubes wherein channel members were secured to the exterior of the tube. In the preferred embodiment shown therein, each channel member formed two generally radially extending fins. According to the invention described and claimed in my parent application aforesaid, one or more channel members may be secured to the exterior of the tube as by resistance welding, or otherwise autogenously welding the base portions thereof to the tube, and thereafter the channel members are deformed so that each channel member is formed into a single fin. The deforming operation can be carried out to produce tubes more or less streamlined to transverse flow and to produce fins of various shapes adapted for various specific purposes only a few of which are disclosed herein. A general object of the invention claimed herein is the provision of an efficient and economical apparatus for producing such tubes, and carrying out the preferred method of manufacturing them.

Referring to the drawings, Fig. 1 is a perspective of a preferred form of finned tube made according to my invention and embodying longitudinally extending fins on diametrically opposite surfaces of the tube; Fig. 2 is a transverse section through the finned tube of Fig. 1 showing the tube as it appears at an early stage in the manufacturing process; Fig. 3 is a similar section illustrating the tube as it appears after a subsequent step has been carried out; Fig. 4 is a transverse section through a modified form of tube; Fig. 5 is a perspective illustrating a further modification of my invention; Figs. 6 and 7 are transverse sections illustrating steps in the manufacture of the tube shown in Fig. 5 corresponding to the steps illustrated in Figs. 2 and 3; and Figs. 8 and 9 are diagrammatic plan and elevational views, respectively, of a preferred form of my apparatus which is adapted to carry out my method and manufacture the tubes illustrated in Figs. 1 to 7.

A preferred form of my invention as illustrated in Fig. 1 of the drawings may comprise a tube 10 having fin members indicated generally at 11 secured to the exterior thereof at diametrically opposite points. Each fin member preferably comprises a base portion 12 welded as indicated at 13 to the exterior of the tube and two flange portions 14 extending from and formed integrally with the base portions, the flange portions being bent toward each other and preferably welded together adjacent their outer edges as indicated diagrammatically at 15 so that the flanges are joined together to form a single fin having an open space 16 therein. The advantages and uses of tubes of this type are set forth in greater detail in my aforesaid parent application.

In Figs. 2 and 3 I have illustrated steps in a preferred method of manufacturing the tubing shown in Fig. 1. As shown in Fig. 2, the members 11 are preferably initially in the form of open channels. These are positioned on the tube as shown and are preferably welded thereto in the manner described in my prior patents aforesaid by electrode rolls engaging the bases 12 of the channels and arranged to produce autogenously welded areas 13 with their centers substantially evenly spaced along the bases 12 and arranged to insure adequate paths for the transfer of heat between the tube, the base portions 12 and the flanges 14. After the welding operation has been completed, the flanges 14 are bent toward each other to produce the structure illustrated in Fig. 3, thereafter the flanges are welded as at 15 adjacent their outer edges, these welds being either continuous or spaced any convenient distance apart, say about ½ inch in a tube of the general size shown in the drawing. For most purposes it is not necessary to provide a continuous weld between the flanges, although for some services such a weld may be required or preferred.

In order to carry out the operations of welding the channels to the tube, deforming the channels and welding the flanges of the channels together rapidly and economically, I have provided an apparatus in which the various operations are performed successively, the tube preferably moving continuously therethrough. A preferred form of apparatus is somewhat diagrammatically illustrated in Figs. 8 and 9. Such an apparatus may comprise a suitable base or frame (not shown) supporting a series of rolls for carrying out the various operations and for guiding the tube and channels through the apparatus. The tube and the channels 11 are progressed through the apparatus in the direction of the arrow and the tube and channels are first entered between the guide rolls 20, which engage the external surfaces of the tube and conform to a substantial portion of the circumference thereof, thereby restraining the tube against lateral displacement, and the guide rolls 21, which enter the channels to guide and align the channel members with respect to the tube before they are welded thereto. Next, the tube is engaged by a second series of guide rolls 22, while disposed adjacent to these rolls there are electrode rolls 23 suitably connected to a source of current which is controlled preferably in the manner described in my aforesaid patents to produce rows of intermittent welds between the bases 12 of both members 11 and the tube. The electrode rolls preferably engage the bases 12 of the channels and the arrangement is such that the current flows from one electrode roll 23 through the channel bases and tube to the other roll 23, effecting simultaneous welding of oppositely disposed areas between the tube and the bases of the respective channels.

The tube with the channels secured thereto then passes between the tube guide rolls 24 and the channel guide rolls 25. The tube at this point has the cross-sectional appearance illustrated in Fig. 2 and is preferably substantially identical with the tube described and claimed in my aforesaid Patent No. 2,261,137; i. e., the welded areas 13 are so shaped and proportioned that the path for the flow of heat from the tube through the welded areas and into the base of the channel is at least substantially as great as the path for the transfer of heat from the base of the channel to the flanges. This is preferably accomplished by making the total welded area at least substantially equal to the combined longitudinal cross-sectional area of the flanges adjacent the base, and the total perimetric length of the welded area at least substantially equal to, and preferably greater than, twice the length of the channel, as described in detail in my said patent. The tube, with the channel members secured thereto, is then passed between a pair of forming rolls 26 which, as illustrated in the drawings, are provided with central reduced portions 27 to receive the tube and tapered portions 28 and cylindrical portions 29 to engage the flanges 14 and force them together into the form shown in Fig. 3.

The tube is completed by being passed between pairs of flange welding rolls 30 which engage the flanges 13 and 14 of members 11 and which are connected with suitable sources of electricity (not shown) to produce the welds 15 shown in Fig. 1. In each of the welding operations the pressure of the electrode rolls and the flow of current and the timing are properly correlated to produce the desired character of weld. The timing of the flow of current is preferably controlled by thyratron controls which accurately time the current to produce welds of the desired duration. The tube may be progressed through the machine by driving the electrode rolls 23, the forming rolls 26 and the electrode rolls 30 at substantially the same peripheral speeds by any convenient mechanism. The tube then passes through the final guide rolls 31 and is discharged from the machine.

From the foregoing, it will be evident that my apparatus is adapted to produce finned tubing rapidly and economically, the several steps of the manufacturing method being carried out successively while the tube is progressed through the single apparatus. In practice, the operation can be carried out at speeds of 20 to 25 feet per minute without difficulty and by reason of the fact that in the preferred form identical welding operations are performed on opposite sides of the tube, the completed tube is straight and free from destructive strains.

In Fig. 4 of the drawings I have illustrated a tube which is particularly adapted for boiler wall structures, this tube comprising the central tubular member 32 with fin members 33 secured to diametrically opposite surfaces thereof. The fin members 33 are generally similar to the members 11 heretofore described in that they comprise base portions 34 welded to the exterior of the tube 31 and flanges 35 extending therefrom and welded together near their outer edges, as indicated at 36. The fin members differ from those previously described in that the flanges 35 are bent so that nearly all of their inner surfaces are in engagement with each other, there being only a very small space 37 between the flanges immediately adjacent the base portions 34. This type of structure is particularly adapted for boiler walls, it being possible to weld a series of flanges of this type together to form a continuous wall structure. Because of their strength and rigidity, these tubes, as well as the other forms shown herein, may be used with advantage as structural members in environments where their heat exchange ability is not important. Such tubes are also adapted for some services where there is a longitudinal flow of fluid along the exterior of the tubes and very severe operating conditions. Tubes of this type may be manufactured as described heretofore with the apparatus shown in Figs. 8 and 9, it only being necessary to change the shape of the forming rolls to conform to the desired shape of the fin members.

In Figs. 5, 6 and 7 I have illustrated a further modification of my invention wherein the tube 40 is provided with fin members 41, the bases 42 of these fin members being much wider than the bases shown in Fig. 1 in proportion to the circumference of the tube so that the fin members extend around a considerable portion of the tube and provide a greater streamlined effect than the constructions illustrated in Figs. 1 and 4. In manufacturing tubes of this sort, the base portions 42 are preferably curved to conform to the tube and may be welded to the tube by a series of centrally disposed welded areas indicated diagrammatically at 43 and preferably produced as described in my aforesaid patents. If the operating conditions are severe and the heat load is great, additional rows of welds as indicated at 44 and 45 may be provided. In case such additional welds are deemed necessary, additional welding rolls will be required in the apparatus or it may be necessary to pass the tube through the fin welding apparatus more than once. However, the general principles of the welding apparatus and the method employed in manufacturing such tubes are identical with those heretofore described, the channel members first being welded to the tube, then formed into the shape shown and finally the flanges 46 are welded together adjacent the outer edges thereof as indicated particularly at 48. Obviously, the shape and proportions of the fins may be varied from the forms shown herein, depending on the requirements of the service for which the tube is intended.

Tubes with fins of various designs can be produced rapidly and economically by the preferred apparatus disclosed herein, the required configuration of the fins being produced by substituting for the forming rolls illustrated in Figures 8 and 9, forming rolls of proper shape to form the metal into the desired shape.

Various changes and modifications in my invention will become apparent to those skilled in the art. It is, therefore, to be understood that my patent is not limited to the preferred form described herein, or in any manner other than by the appended claims when given the range of equivalents to which my patent may be entitled.

I claim:

1. An apparatus for making finned tubes comprising in combination, means for guiding a tube and a pair of oppositely disposed channel members in engagement with the exterior of the tube through the apparatus, said guiding means including rolls engaging said tube throughout a substantial portion of the circumference thereof and rolls engaging within said channel members, means for advancing said tube and channels through the apparatus, and means for electrically welding said channel to said tube.

2. An apparatus for making finned tubes comprising, in combination, means for guiding a tube and a pair of oppositely disposed channel members through the apparatus, and a pair of oppositely disposed electrode rolls adapted to engage the bases of said channels for resistance welding said channels to said tube, said guiding means including guides engaging within said channel members in advance of said welding rolls for holding said channel members in position against said tube and pairs of oppositely disposed rolls having grooved surfaces engaging said tube throughout a substantial portion of the circumference thereof for retaining said tube against vertical or lateral displacement, one pair of said rolls being disposed with their axes lying substantially in the plane of the axes of the welding rolls.

JOHN W. BROWN, Jr.

REFERENCES CITED

The following references are of record in the file of this patent:

UNITED STATES PATENTS

| Number | Name | Date |
|---|---|---|
| 1,195,592 | Keegan | Aug. 22, 1916 |
| 1,611,875 | Belmont | Dec. 28, 1926 |
| 2,047,254 | Burnish | July 14, 1936 |
| 2,151,422 | Ganahl | Mar. 21, 1939 |
| 2,298,249 | Brown | Oct. 6, 1942 |